United States Patent [19]

O'Loughlin et al.

[11] Patent Number: 5,269,560
[45] Date of Patent: Dec. 14, 1993

[54] INITIATOR ASSEMBLY FOR AIR BAG INFLATOR

[75] Inventors: John P. O'Loughlin; Gordon J. Klages; Timothy A. Swann, all of Mesa; Jerome W. Emery, Tempe, all of Ariz.

[73] Assignee: TWR Inc., Lyndhurst, Ohio

[21] Appl. No.: 897,573

[22] Filed: Jun. 11, 1992

Related U.S. Application Data

[63] Continuation of Ser. No. 629,273, Dec. 18, 1990, abandoned.

[51] Int. Cl.⁵ .............................................. B60R 21/26
[52] U.S. Cl. ...................................... 280/736; 102/531
[58] Field of Search ........... 280/736, 741, 743, 741 R, 280/736; 102/530, 531, 202.4, 202.9, 202.12, 202.14, 202.5

[56] References Cited

U.S. PATENT DOCUMENTS

| | | | |
|---|---|---|---|
| 3,672,301 | 6/1972 | Abbott | 102/530 |
| 3,895,098 | 7/1975 | Pietz | 423/351 |
| 3,990,367 | 11/1976 | Smith | 102/531 |
| 4,278,638 | 7/1981 | Nilsson et al. | 422/166 |
| 4,296,084 | 10/1981 | Adams et al. | 422/166 |
| 4,530,516 | 7/1985 | Adams et al. | 280/741 |
| 4,578,247 | 3/1986 | Bolieau | 280/741 |
| 4,590,041 | 5/1986 | Hill | 280/741 |
| 4,600,123 | 7/1986 | Galbraith | 102/530 |
| 4,690,063 | 9/1987 | Granier et al. | 102/530 |
| 4,722,551 | 2/1988 | Adams | 280/736 |
| 4,727,808 | 3/1988 | Wang et al. | 102/202.5 |
| 4,858,956 | 8/1989 | Taxon | 251/129.07 |
| 4,902,036 | 2/1990 | Zander et al. | 280/740 |
| 4,944,528 | 7/1990 | Nilsson et al. | 280/741 |
| 5,000,479 | 3/1991 | Werner et al. | 280/741 |
| 5,056,815 | 10/1991 | Geisreiter | 280/736 |
| 5,062,367 | 11/1991 | Hayashi et al. | 280/741 |

FOREIGN PATENT DOCUMENTS 0172046 7/1989 Japan .................. 280/743

Primary Examiner—Margaret A. Focarino
Assistant Examiner—Paul Dickson
Attorney, Agent, or Firm—Tarolli, Sundheim & Covell

[57] ABSTRACT

An inflator for inflating an air bag includes a housing. A quantity of gas generating material is disposed within the housing. The gas generating material when ignited generates gas for inflating the air bag. An igniter is actuatable to ignite the gas generating material. A weld adaptor is welded to the housing. A body of injection molded plastic material adheres to both the igniter and the weld adaptor to attach the igniter to the weld adaptor. The weld adaptor is welded to a cover part of the inflator housing.

8 Claims, 3 Drawing Sheets

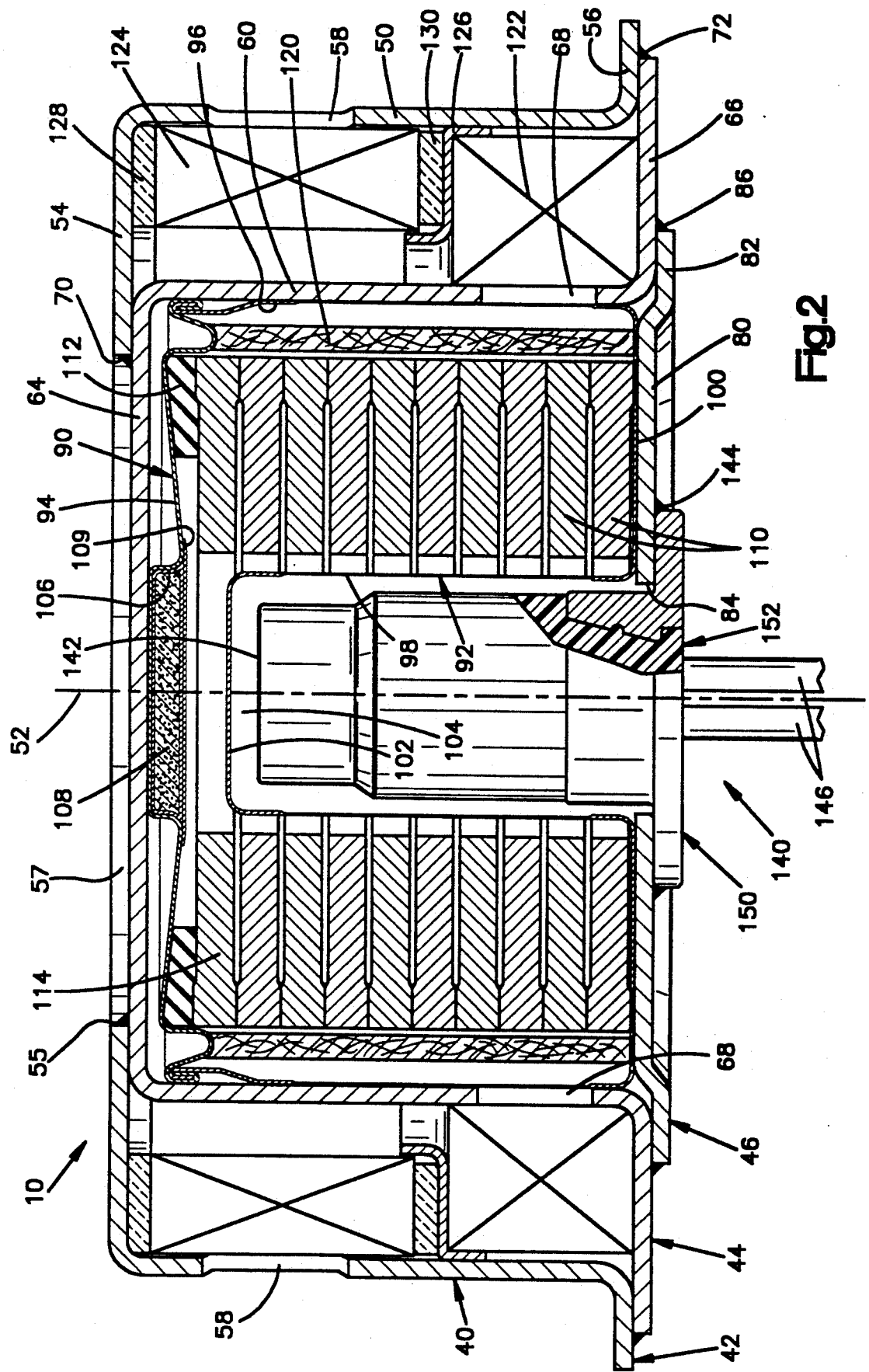

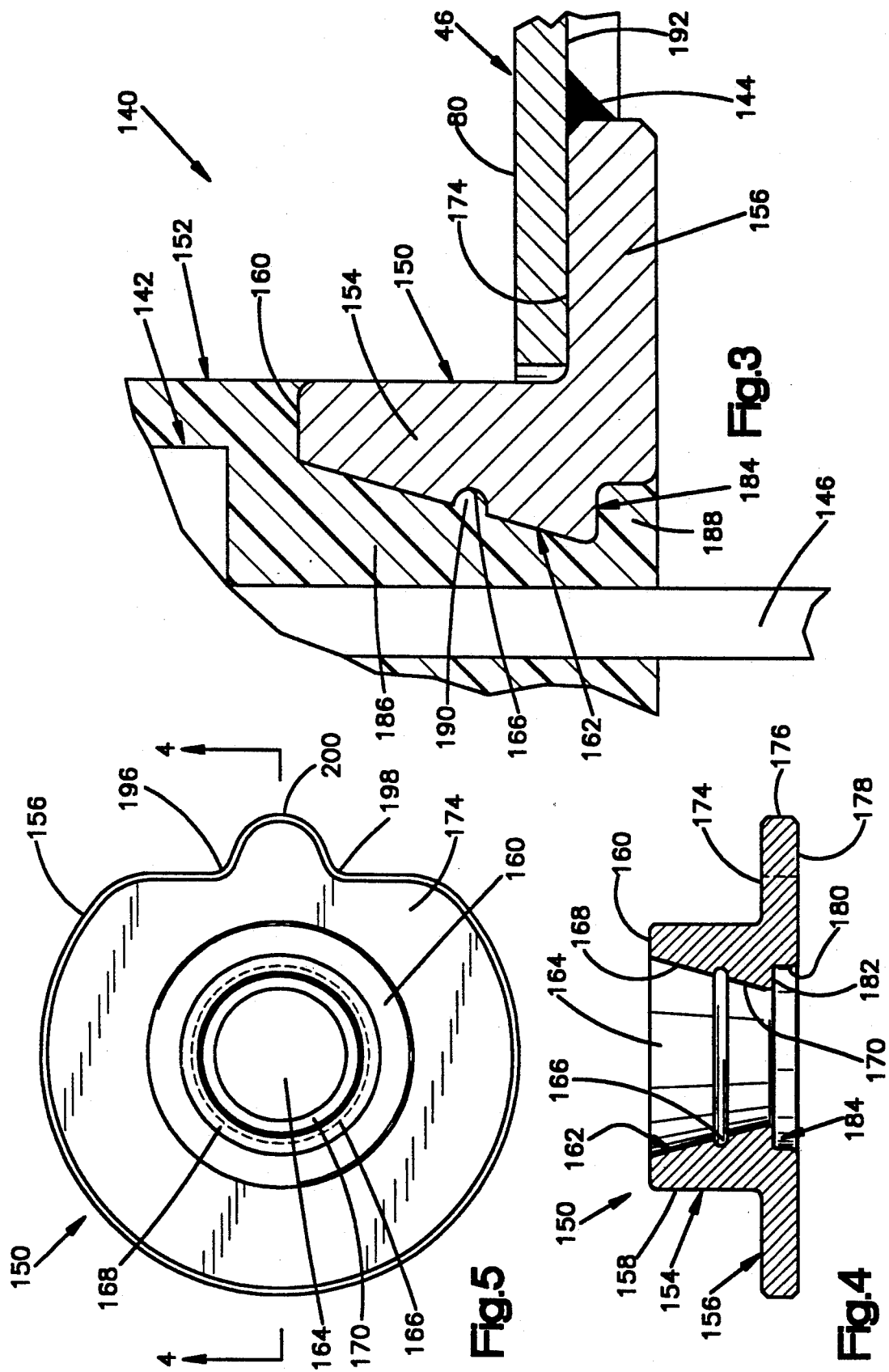

INITIATOR ASSEMBLY FOR AIR BAG INFLATOR

This is a continuation of copending application Ser. No. 07/629,273 filed on Dec. 18, 1990, now abandoned.

BACKGROUND OF THE INVENTION

1. Technical Field

The present invention relates to a gas generating device, and particularly to an inflator for inflating an air bag to protect an occupant of a vehicle.

2. Description of the Prior Art

It is well known to protect a vehicle occupant using an air bag that is inflated when the vehicle encounters sudden deceleration, such as in a collision. The air bag restrains movement of the vehicle occupant during the collision. The air bag is typically inflated by gas generated by activation of gas generating material. The gas generating material is contained in an air bag inflator.

An air bag inflator commonly has an electrically actuatable igniter to ignite the gas generating material. The inflator includes structure for securing the igniter to the housing of the inflator. It is desirable to have a small, light weight, inexpensive, and easy to assemble structure for securing the igniter to the housing An inflator for an air bag which protects the driver of a vehicle is mounted in the vehicle steering wheel. Such an inflator is preferably small and light weight to minimize the rotating mass of the steering wheel assembly. The inflator should also, for ease of manufacture and low cost, have a minimal number of parts which are simple to assemble.

SUMMARY OF THE INVENTION

The present invention is an inflator for inflating an air bag. The inflator includes an inflator housing. A quantity of gas generating material is located in the housing. The gas generating material when ignited generates gas for inflating the air bag. An igniter is actuatable to ignite the gas generating material.

The inflator includes means for securing the igniter to the housing. The securing means includes a weld adaptor made of a weldable material and welded to the housing. The securing means also includes a plastic material for attaching the igniter to the weld adaptor. The plastic material adheres to both the igniter and the weld adaptor to attach the igniter to the weld adaptor. In a preferred embodiment, the weld adaptor is welded to a cover which is part of the inflator housing. The cover is welded to another weldable part of the inflator housing.

BRIEF DESCRIPTION OF THE DRAWINGS

Further features of the present invention will become apparent to those skilled in the art to which the present invention relates from reading the following specification with reference to the accompanying drawings, in which:

FIG. 2 is a transverse view, partially in section, of the inflator of FIG. 1;

FIG. 3 is an enlarged view showing a portion of the initiator assembly of the inflator of FIG. 2 including an igniter and a weld adaptor;

FIG. 4 is a transverse sectional view of the weld adaptor of FIG. 3; and

FIG. 5 is a top plan view of the weld adaptor of FIG. 4.

DESCRIPTION OF A PREFERRED EMBODIMENT OF THE INVENTION

Figure 1:
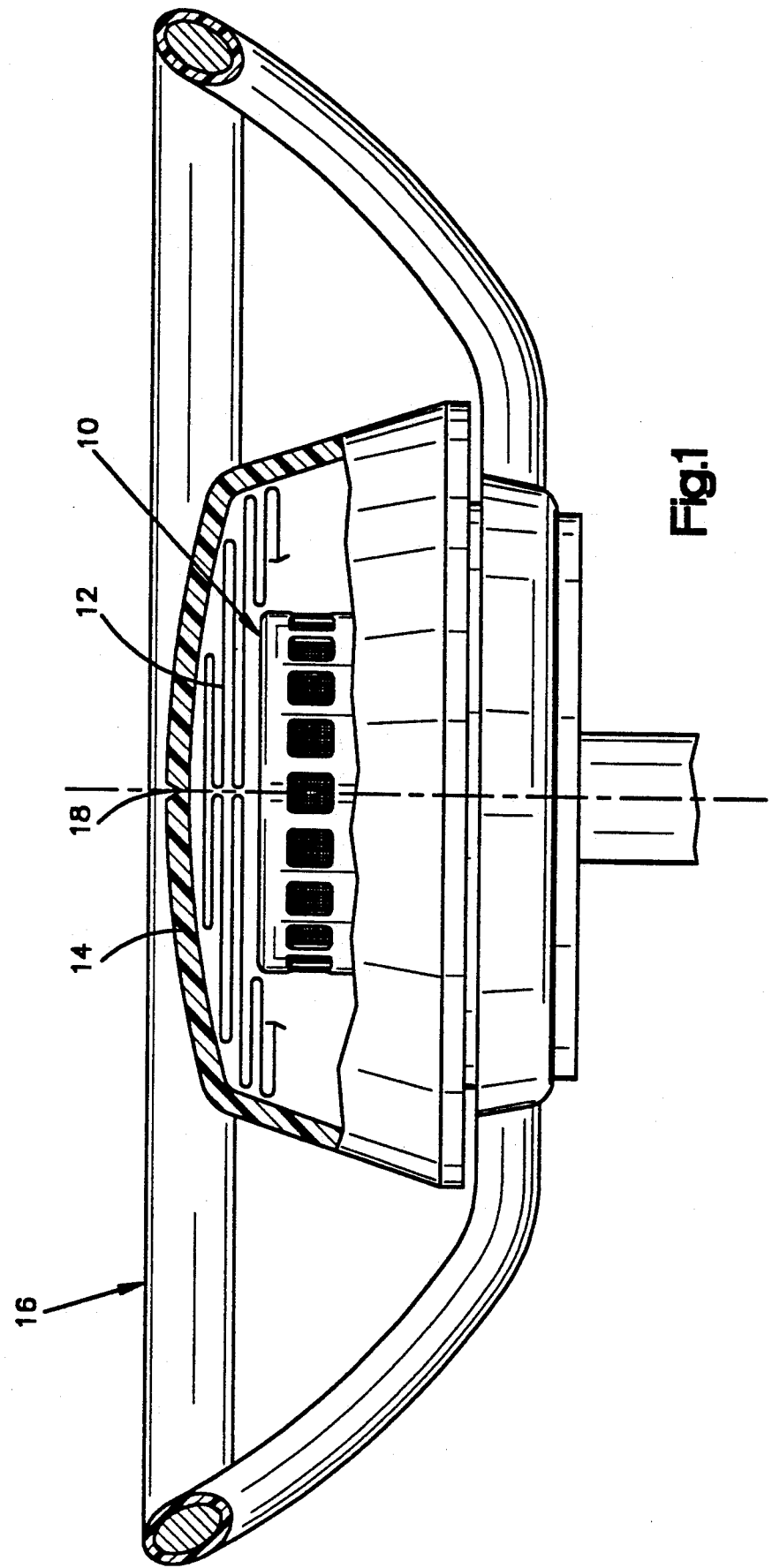
FIG. 1 is a transverse view, partially in section, of a vehicle steering wheel with an inflatable occupant restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54 of the diffuser cup 42. The end wall 54 and the flange 56 are generally parallel to each other and perpendicular to the axis 52. An annular array of gas outlet openings 58 is located in an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 is located in a lower portion of the combustion side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but slightly offset circular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup side wall 60. The side wall 96 has a reduced thickness in the are adjacent the openings 68 in the combustion cup side wall 60. The canister lower section 92 also has a cylindrical inner side wall 98 spaced radially inwardly from the outer side wall 96. The side wall 98 has a reduced thickness in the area adjacent the igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser upper flange 54. Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The initiator assembly 140 includes an igniter 142. The igniter 142 includes a pair of wire leads 146 which extend outwardly from the initiator assembly 140. The wire leads 146 are connectable to a collision sensor (not shown). The wire leads 146 are connected to a resistance wire embedded in an ignition material in the igniter 142. The igniter 142 may be of any suitable well known construction. A thin plastic film (not shown) is located on the outside of the upper portion of the igniter 142, to prevent metal-to-metal contact which would ground the igniter 142 and disable the inflator 10. Instead of wire leads, the igniter 142 could include pins (not shown) for connection to the collision sensor.

Upon the occurrence of a collision or other sudden vehicle deceleration, an electrical current flows from the collision sensor through the wire leads 146 or the pins (not shown) to the igniter 142. The resistance wire sets off the ignition material which deflagrates a charge in the igniter 142. Deflagration of the charge forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the flowing gas. When the gas cools, molten products are plated onto the prefilter 120. The gas flows through the openings 68 and into the slag screen 122.

The slag screen 122 removes and traps particles from the flowing gas. The slag screen also cools the flowing gas. When the gas cools, molten combustion products are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

In accordance with the present invention, the igniter 142 is secured to the housing cover 46 by means consisting of a weld adaptor 150 and a body of injection molded plastic material 152. The plastic material 152 secures the igniter 142 to the weld adaptor 150.

The weld adaptor 150 (FIG. 4) includes socket 154 and a flange 156. The socket 154 has a cylindrical circumferential outer surface 158 and a radially extending inward end face 160. A conical surface 162 partially defines a passage 164 through the socket 154. A circumferential groove 166 divides the conical surface 162 into an axially inner portion 168 and an axially outer portion 170. The conical surface 162 tapers radially outwardly as it extends upward away from the flange 156 and into the recess 104.

The flange 156 of the weld adaptor 150 has a radially extending inward face 174, a cylindrical circumferential outer surface 176, and a radially extending outer end face 178. An annular axially extending surface 180 and an annular radially extending surface 182 in the center of flange 156 partially define and complete the passage 164. The surfaces 180, 182 also define an outwardly facing shoulder 184 o the weld adaptor 150.

The weld adaptor 150 is made of a weldable metal suitable for cold heading such as UNS S30430 stainless steel. The plastic material 152 is a structural member which, when it cools, adheres to both the weld adaptor 150 and the igniter 142. The plastic material 152 may be a polyphenylene sulfide resin, with a 40% glass fill, which can be obtained from Phillips 66 Plastics, under the brand name Ryton R4XE. Other materials which can be injection molded and which will adhere to the igniter 142 and the weld adaptor 150 are also suitable for use.

To secure the igniter 142 to the weld adaptor 150 (FIG. 3), the igniter 142 and the weld adaptor 150 are positioned relative to each other in a die (not shown). The igniter 142 extends through the passage 164 in the weld adaptor 150. The plastic material 152 in a molten form is injected into the die. The plastic material 152 adheres to the end face 160, the conical surface 162, and the surfaces 180 and 182 of the weld adaptor 150. A portion 186 of the plastic material 152 is located in the passage 164, between the igniter 142 and the weld adaptor 150. The plastic material portion 186 adheres to the igniter 142 and to the conical surface 162 of the weld adaptor 150. Another portion 188 of the plastic material 152 is located against the shoulder 184 of the weld adaptor 150 and adheres to the surfaces 180 and 182 forming the shoulder 184. Yet another portion 190 of the plastic material flows into the groove 166 in the weld adaptor 150 to lock the plastic material 152 to the weld adaptor 150.

After the igniter 142 is secured to the weld adaptor 150, the weld adaptor 150 is welded to the combustion chamber cover 46. The inward face 174 on the weld adaptor 150 engages a radially extending outer surface 192 of the central portion 80 of the cover 46. The flange 156 is continuously welded to the cover 46 at the circumferential weld location 144. The cover 46 is then welded to the combustion cup 44. The igniter 142 is thereby secured in position in the inflator 10.

With the igniter 142 secured in position in the inflator 10, the plastic material 152 engages the axial end face 160 and the conical surface 162 of the weld adaptor 150, to block movement of the igniter 142 from its desired location in a direction axially outwardly of the inflator 10. This inhibits unauthorized or improper removal of the igniter 142 from the inflator 10. The plastic material 152 also engages the axially outwardly facing shoulder 184 of the weld adaptor 150, to block movement of the igniter 142 from its desired location in a direction into the inflator 10. This prevents the igniter 142 from inadvertently being pushed into the inflator 10.

As illustrated in FIG. 5, the flange 156 of the weld adaptor 150 may be cut back radially at spaced locations 196 and 198 to form a nose 200. The optional nose 200 can be recognized by the machinery used to position the assembled inflator 10 in the air bag module which is attached to the vehicle steering wheel 16. This feature is beneficial if, for example, polarized electrical pin connections are used on the igniter. Alternatively, the weld adaptor 150 can be round.

Welding the adaptor 150 to the cover and welding the cover 46 to the combustion cup 44 provides a barrier to prevent contamination of the interior of the inflator 10. Such a barrier is more difficult to obtain with the known threaded or crimped connections of the igniter to an inflator housing. Welding also provides a tamper resistant joint, to increase the difficulty of improper disassembly of the inflator. This, again, is advantageous over inflators which utilize a threaded or crimped connection for the igniter.

The injection molded plastic material 152 used to secure the igniter 142 to the weld adaptor 150 is very light in weight. The present invention thus provides an initiator assembly 140 which has a small number of parts, including only the igniter 142 and the weld adaptor 150 joined together by the plastic injection molding material 152. The weld adaptor 150 is easily welded directly to the cover 46, and the cover 46 is easily welded directly to the combustion cup 44. This structure is relatively low in cost, light in weight, and easy to assemble.

From the above description of the invention, those skilled in the art will perceive improvements, changes and modifications. Such improvements, changes and modifications within the skill of the art are intended to be covered by the appended claims.

We claim:
1. Apparatus for inflating an air bag, comprising:
an inflator housing defining a chamber in said housing,
a quantity of gas generating material disposed within said chamber which, when ignited, generates gas for inflating the air bag,
an igniter recess in said gas generating material for receiving an igniter therein,
a cover separate from said housing, said cover being fixed to said housing and closing said chamber except for said igniter recess, said cover having an igniter opening aligned with said igniter recess,
an igniter actuatable to ignite said gas generating material, and
means for securing said igniter to said housing and in said igniter recess, comprising:
a weld adaptor separate from said cover and from said housing, and
a body of plastic material attaching said igniter to said weld adaptor, said weld adaptor being larger in diameter than said igniter recess and when fixed to said cover with said igniter attached thereto closing said igniter recess, said weld adaptor being welded to said cover and attaching said igniter to said housing;

said weld adaptor including a conical surface in a socket portion of said weld adaptor and surface means for defining a circumferential groove dividing said conical surface into an axially inner portion and an axially outer portion, a portion of said plastic material being disposed in said groove in said weld adaptor to lock said plastic material to said weld adaptor, said weld adaptor having an annular axially extending surface and an annular radially extending surface together defining an outwardly facing shoulder on said weld adaptor, another portion of said plastic material being located against said shoulder of said weld adaptor and adhering to said surfaces forming said shoulder.

2. Apparatus as defined in claim 1 wherein said plastic material is a body of solidified injection molded material at least partially disposed between said igniter and said weld adaptor and adhered to said igniter and to said weld adaptor.

3. Apparatus as defined in claim 1 wherein said weld adaptor includes means for blocking movement of said igniter in a first direction into said housing and means for blocking movement of said igniter in a second direction out of said housing.

4. Apparatus as defined in claim 1 wherein said socket portion has surface means for defining a passage through which said igniter extends and a flange portion, the outer perimeter of said flange portion being welded to said housing cover at a location disposed radially inwardly of the outer perimeter of said gas generating material.

5. Apparatus as defined in claim 1 comprising projecting means on said weld adaptor for selectively angularly orienting said inflator.

6. Apparatus for inflating an air bag, comprising:
an inflator housing defining a chamber in said housing,
a quantity of gas generating material disposed within said chamber which, when ignited, generates gas for inflating the air bag,
an igniter recess in said gas generating material for receiving an igniter therein, said igniter recess being relatively small in diameter as compared to said chamber,
a cover separate from said housing, said cover being slightly larger in diameter than said chamber and when fixed to said housing closing said chamber except for said igniter recess, said cover having an igniter opening aligned with said igniter recess,
an igniter actuatable to ignite said gas generating material, and
means for securing said igniter to said housing and in said igniter recess, comprising:
a relatively small diameter weld adaptor separate from said cover and from said housing, and
a body of plastic material attaching said igniter to said weld adaptor, said weld adaptor being slightly larger in diameter than said igniter recess and when fixed to said cover with said igniter attached thereto closing said igniter recess,
said weld adaptor being welded to said cover and attaching said igniter to said housing;
said weld adaptor including a conical surface in a socket portion of said weld adaptor and surface means for defining a circumferential groove dividing said conical surface into an axially inner portion and an axially outer portion, a portion of said plastic material being disposed in said groove in said weld adaptor to lock said plastic material to said weld adaptor, said weld adaptor having an annular axially extending surface and an annular radially extending surface together defining an outwardly facing shoulder on said weld adaptor, another portion of said plastic material being located against said shoulder of said weld adaptor and adhering to said surfaces forming said shoulder.

7. Apparatus for inflating an air bag, comprising:
an inflator housing defining a chamber in said housing,
a quantity of gas generating material disposed within said chamber which, when ignited, generates gas for inflating the air bag,
an igniter recess in said gas generating material for receiving an igniter therein,
a cover separate from said housing, said cover being larger in diameter than said chamber and when fixed to said housing closing said chamber except for said igniter recess, said cover having an igniter opening aligned with said igniter recess,
an igniter actuatable to ignite said gas generating material, and
means for securing said igniter to said housing and in said igniter recess, comprising:
a weld adaptor separate from said cover and from said housing, and
a body of plastic material attaching said igniter to said weld adaptor, said weld adaptor being larger in diameter than said igniter recess and when fixed to said cover with said igniter attached thereto closing said igniter recess,
said weld adaptor being welded to said cover and attaching said igniter to said housing,
said weld adaptor including means for blocking movement of said igniter in a first direction into said housing and means for blocking movement of said igniter in a second direction out of said housing comprising a conical surface in a socket portion of said weld adaptor,
said means for blocking movement of said igniter in said first direction into said housing comprising a surface on said weld adaptor which faces generally away from said first direction and a portion of said plastic material engaging said surface to block movement of said plastic material and thereby said igniter in said first direction;
said weld adaptor including surface means for defining a circumferential groove dividing said conical surface into an axially inner portion and an axially outer portion, a portion of said plastic material being disposed in said groove in said weld adaptor to lock said plastic material to said weld adaptor, said weld adaptor having an annular axially extending surface and an annular radially extending surface together defining an outwardly facing shoulder on said weld adaptor, another portion of said plastic material being located against said shoulder of said weld adaptor and adhering to said surfaces forming said shoulder.

8. Apparatus for inflating an air bag, comprising:
an inflator housing defining a chamber in said housing,
a quantity of gas generating material disposed within said chamber which, when ignited, generates gas for inflating the air bag, an igniter recess in said gas generating material for receiving an igniter therein, a cover separate from said housing, said cover being larger in diameter than said chamber and when fixed to said housing closing said chamber except for said igniter recess, said cover having an igniter opening aligned with said igniter recess, an igniter actuatable to ignite said gas generating material, and means for securing said igniter to said housing and in said igniter recess, comprising:

a weld adaptor separate from said cover and from said housing, and a body of plastic material attaching said igniter to said weld adaptor, said weld adaptor being larger in diameter than said igniter recess and when fixed to said cover with said igniter attached thereto closing said igniter recess, said weld adaptor being welded to said cover and attaching said igniter to said housing, said weld adaptor including means for blocking movement of said igniter in a first direction into said housing and means for blocking movement of said igniter in a second direction out of said housing, said means for blocking movement of said igniter in said second direction out of said housing comprising a conical surface in a socket portion of said weld adaptor and a portion of said plastic material engaging said conical surface to block movement of said plastic material and thereby said igniter in said second direction;

said weld adaptor including surface means for defining a circumferential groove dividing said conical surface into an axially inner portion and an axially outer portion, a portion of said plastic material being disposed in said groove in said weld adaptor to lock said plastic material to said weld adaptor, said weld adaptor having an annular axially extending surface and an annular radially extending surface together defining an outwardly facing shoulder on said weld adaptor, another portion of said plastic material being located against said shoulder of said weld adaptor and adhering to said surfaces forming said shoulder.

* * * * *

UNITED STATES PATENT AND TRADEMARK OFFICE
CERTIFICATE OF CORRECTION

PATENT NO. : 5,269,560
DATED : December 14, 1993
INVENTOR(S) : John P. O'Loughlin, et al It is certified that error appears in the above-identified patent and that said Letters Patent is hereby corrected as shown below:

On the title page, item [73] Assignee: change "TWR" to --TRW--.

Column 9, line 7, after "recess," start a new paragraph.

Signed and Sealed this

Seventh Day of June, 1994

Attest:

BRUCE LEHMAN

Attesting Officer

Commissioner of Patents and Trademarks